United States Patent [19]

Ishikawa

[11] Patent Number: 5,415,254
[45] Date of Patent: May 16, 1995

[54] PANNING BRAKING DEVICE FOR TRIPOD HEAD

[75] Inventor: Masao Ishikawa, Yashio, Japan

[73] Assignee: Heiwa Seiki Kagya Co., Ltd., Yashio, Japan

[21] Appl. No.: 133,331

[22] Filed: Oct. 8, 1993

Related U.S. Application Data

[62] Division of Ser. No. 892,948, Jun. 4, 1992.

[51] Int. Cl.⁶ ............................................. F16D 57/02
[52] U.S. Cl. ..................................... 188/294; 74/527; 74/569
[58] Field of Search ................. 188/69, 265, 290, 294; 248/177, 183, 187; 74/527, 569

[56] References Cited

U.S. PATENT DOCUMENTS

| | | | |
|---|---|---|---|
| 2,155,594 | 4/1939 | Hart | 74/527 |
| 4,447,033 | 5/1984 | Jaumann et al. | 248/563 |
| 4,690,252 | 9/1987 | Kottke et al. | 188/69 |
| 4,959,671 | 9/1990 | Ishikawa | 248/183 X |
| 4,979,709 | 12/1990 | Ishikawa | 248/187 |

FOREIGN PATENT DOCUMENTS 63-9154  2/1988  Japan .

*Primary Examiner*—Robert J. Oberleitner
*Assistant Examiner*—Kevin D. Rutherford
*Attorney, Agent, or Firm*—Armstrong, Westerman, Hattori, McLeland & Naughton

[57] ABSTRACT

A tripod head comprises a panning braking device having a plurality of braking units with different braking forces which is supported on a panning shaft, and a torque switchover mechanism allowing to freely switch over torque on the side of said braking units; a weight balancer having a plurality of spring units, in which one or a plurality of spiral springs with different elastic forces are incorporated, supported on a tilting shaft and a righting moment switchover mechanism allowing to freely switch over a righting moment against the tilting on the sides of the spring units; a tilting braking device having a plurality of braking units with different braking forces which is supported on said tilting shaft, and a torque switchover mechanism allowing to freely switch over torque on the sides of the braking units; and a sliding plate device having a set spring capable of freely floating and sinking, said set spring being in contact with one of the side end surfaces of the sliding plate for securing a device such as a camera, a video camera, a movie camera or the like which is slidable in the longitudinal direction against a camera stand, and supporting said sliding plate under pressure.

6 Claims, 16 Drawing Sheets

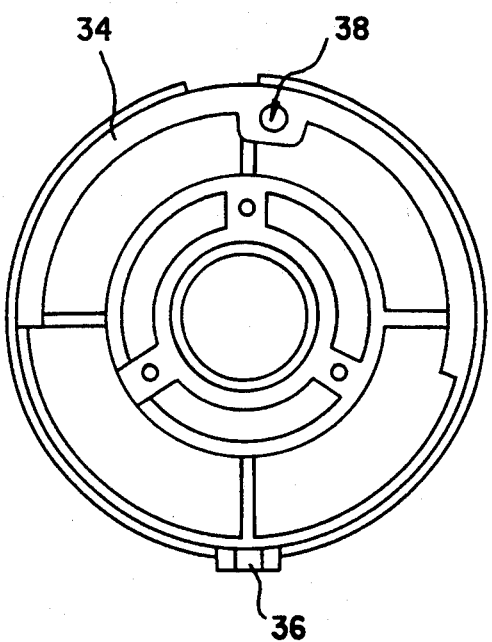
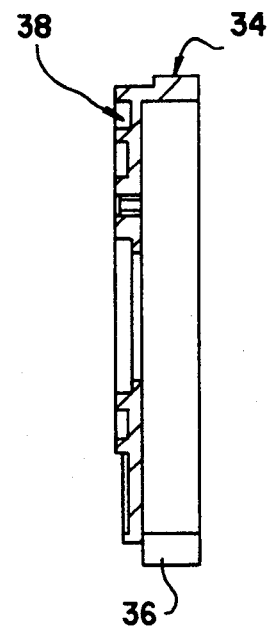
Fig.8(a)          Fig.8(b)
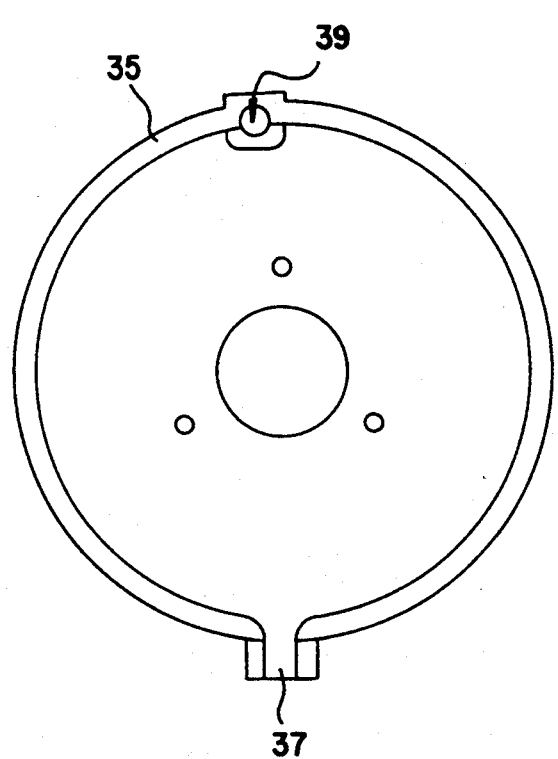
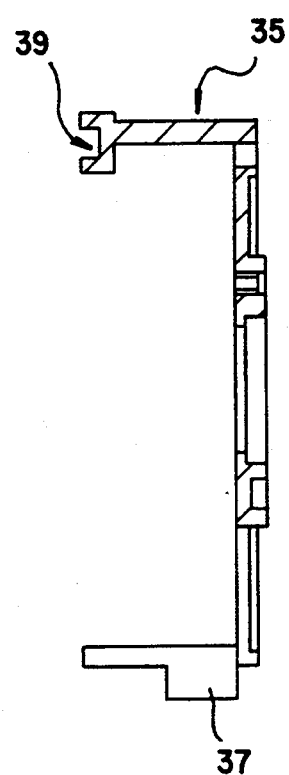
Fig.9(a)          Fig.9(b)

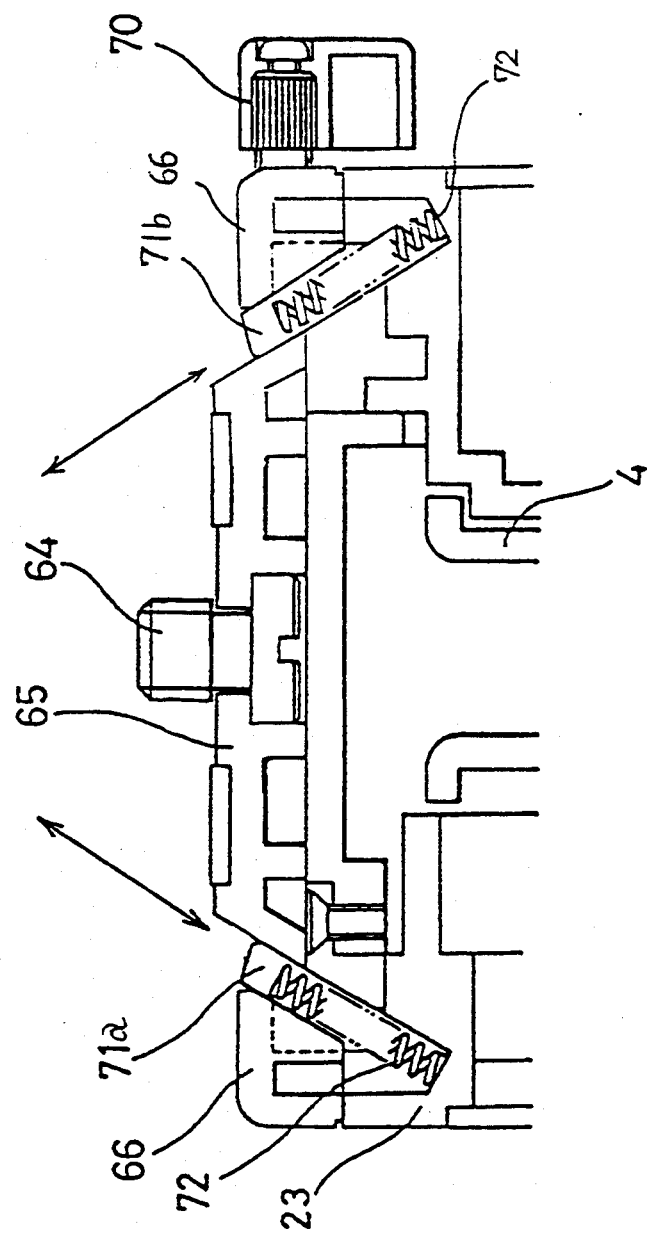

PANNING BRAKING DEVICE FOR TRIPOD HEAD

This is a division of application Ser. No. 07/892,948 filed Jun. 4, 1992, pending.

FIELD OF THE INVENTION

The present invention relates to a tripod head. More particularly, the present invention relates to a tripod head having an excellent operability, which permits a smooth vertical tilting and a horizontal rotation of a camera, a video camera, a movie camera or the like under the effect of appropriate braking force and righting moment, and allows simple and easy mounting thereof.

DESCRIPTION OF THE PRIOR ART

As a device for securing a camera, a video camera, a movie camera or the like as well as for ensuring smooth and free vertical tilting and horizontal rotation, a tripod head has been conventionally known, and various structures and configurations for such a tripod head have been proposed.

As a typical tiltable Tripod head, one which a weight balancer is provided at a tilting portion to generate a righting moment around the rotating shaft against a tilting moment produced by the weight of the device such as a camera so as to give a smooth tilting has been proposed (Japanese Patent Provisional Publication No. 57-83,791, Japanese Patent Publication No. 63-9,154).

In this weight balancer, a plurality of independent force accumulators having a spring member such as a coil spring are parallel supported at the rotation shaft, and each of those is engaged on its outer peripheral surface by means of an engaging device mainly comprising a check pin and a cam mechanism to permit a selective connection between the fixed and the rotating portions. It thus permits tilting in response to the weight of the device mounted on the tripod head by selecting an appropriate force accumulator producing a desired righting moment.

As a tripod head permitting free tilting and horizontal rotation, the present inventor has proposed a braking device substantially comprising a first unit in which a plurality of first braking regulation plates and a plurality of first intermediate members are in turn provided on the rotation shaft and are concentrically fixed to said rotation shaft, a second unit in which a plurality of ring-shaped second intermediate members and a plurality of second braking regulation plates are provided corresponding to the first regulation plates and the first intermediate members of the first unit, respectively, and a viscous fluid provided between the first and the second units, this braking device being installed on the tilting portion and the horizontal rotation portion in order to give smooth tilting and horizontal rotations in response to the weight of the device mounted on the tripod head (Japanese Utility Model Provisional Publication No. 2-96,099, U.S. Pat. No. 4,959,671).

In this braking device, on-off switching of braking is made free for a motion at a desired speed in response to the weight of the device such as a camera.

A tripod head having a sliding plate device provided at the top to simply and easily secure the device has been also known.

As a sliding plate device, one permitting well-balanced fixing in response to the weight of the device mounted thereon has been also proposed by the present inventor (Japanese Utility Model Provisional Publication No. 2-114,297, U.S. Pat. No. 4,979,709).

This sliding plate is mainly composed of a top plate, a plate support movably engaging with the top plate, a pressure lock mechanism provided on the side of the plate support to secure the top plate to the plate support, a vertically movable stop pin provided on the upper surface of the plate support which movably engages with a long groove provided longitudinally at the bottom of the top plate, a stopper provided on the upper surface of the plate support which engages with a short groove provided longitudinally at the bottom of the top plate, and a stop pin removing mechanism for removing the top plate from the plate support.

For the tripod head provided with the weight balancer, the braking device, and the sliding plate device, further improvements are necessary for a satisfactory operability in the actual use and an application for various devices such as a camera, a video camera or a movie camera.

It is a problem for the weight balancer to simply and easily switch over the righting moment. It is required for the braking device to change the braking force in response to the weight of the device mounted on the tripod head, and to simplify and facilitate the switching operation.

Although the above-mentioned sliding plate device is advantageous to achieve a well-balanced mounting of the device such as camera, and to mount or remove the top plate attached to the device onto or from the plate support in the direction of sliding of the top plate, there is a problem in that it is difficult to find the inserting position of the top plate into the plate support, depending upon the size of the device mounted on the top plate. There is, therefore, a strong demand for simply and easily mounting the top plate attached to the device on the plate support.

An object of the present invention is therefore to provide an improved tripod head which has an excellent operability.

Another object of the present invention is to permit a smooth vertical tilting and a horizontal rotation of a device such as a camera, a video camera or a movie camera under the effect of an appropriate braking force and a righting moment.

The other object is to simply and easily mount the device.

These and other objects, features and advantages of the present invention will become more apparent upon a reading of the following detailed description and drawings.

BRIEF DESCRIPTION OF THE DRAWINGS

FIGS. 8(a) and 8(b) are a plan view and a sectional view illustrating an embodiment of a case for the spring unit, respectively;

FIGS. 9(a) and 9(b) are a plan view and a sectional view illustrating another case for the spring unit, respectively;

FIG. 17 illustrates the other embodiment of the sliding plate device.

DETAILED DESCRIPTION OF EMBODIMENTS

Figure 1:
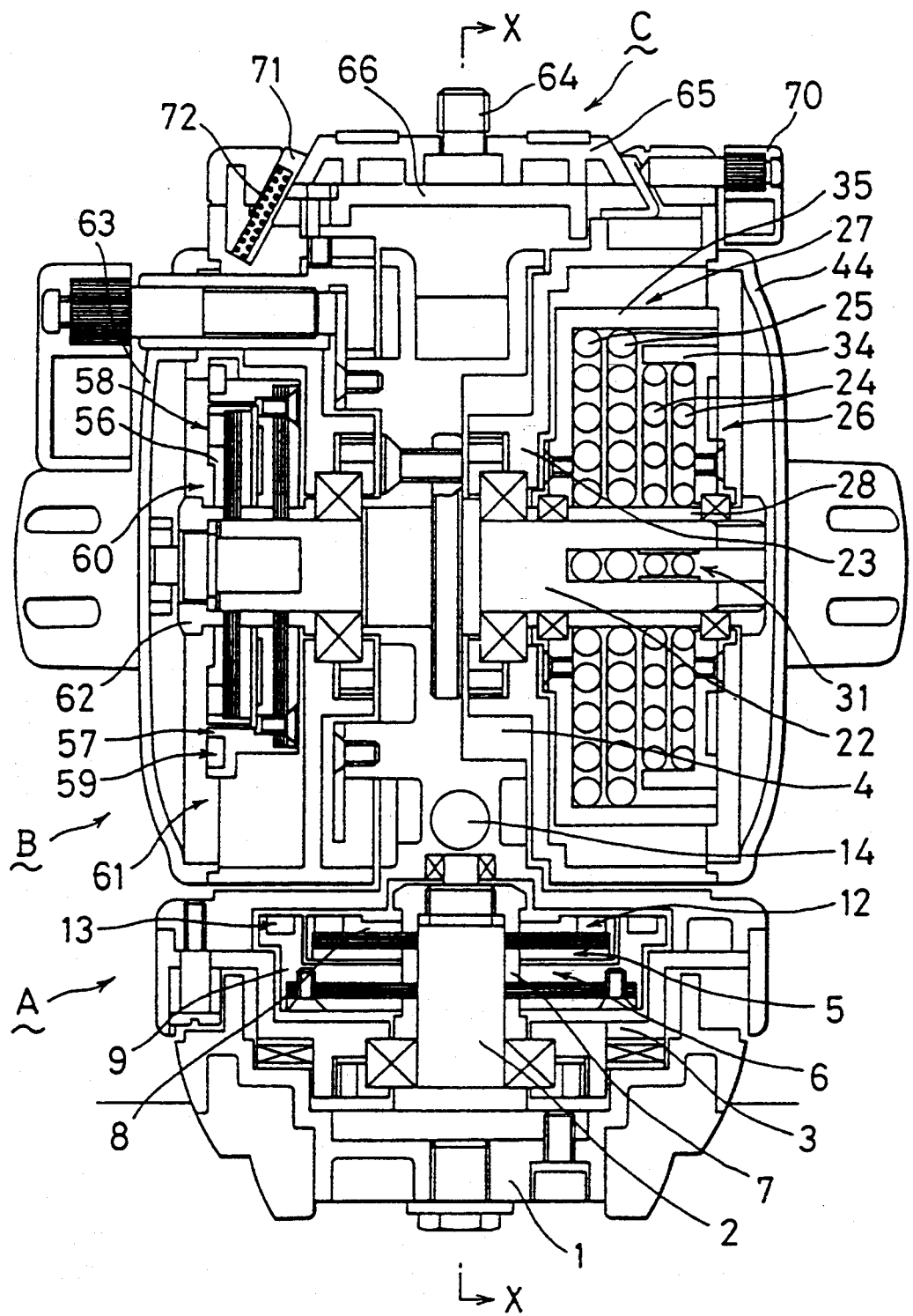
FIG. 1 is a sectional view illustrating an embodiment of the tripod head of the present invention.

In the embodiment shown in FIG. 1, for example, a panning portion (A) rotating horizontally is provided at the bottom of a tripod head, and a tilting portion (B) which vertically tilts and a sliding plate portion (C) for securing a device such as a camera, a video camera or a movie camera are sequentially connected to one another.

In the panning portion (A), a rotating member (3) is rotatably connected through a bearing, etc. to a panning shaft (2) as a center of a horizontal rotation which is fixed to a fixed portion (1). This fixed section (1) does not rotate. A longitudinal shaft (4) provided into the tilting portion (B) is connected to the rotating member (3). A rotation of the rotating member (3) is transmitted through the longitudinal shaft (4) to the tilting portion (B) and the sliding plate portion (C) connected thereto so as to give a desired panning of the device mounted on the tripod head.

A panning braking device is provided on the panning shaft (2).

Figure 2:
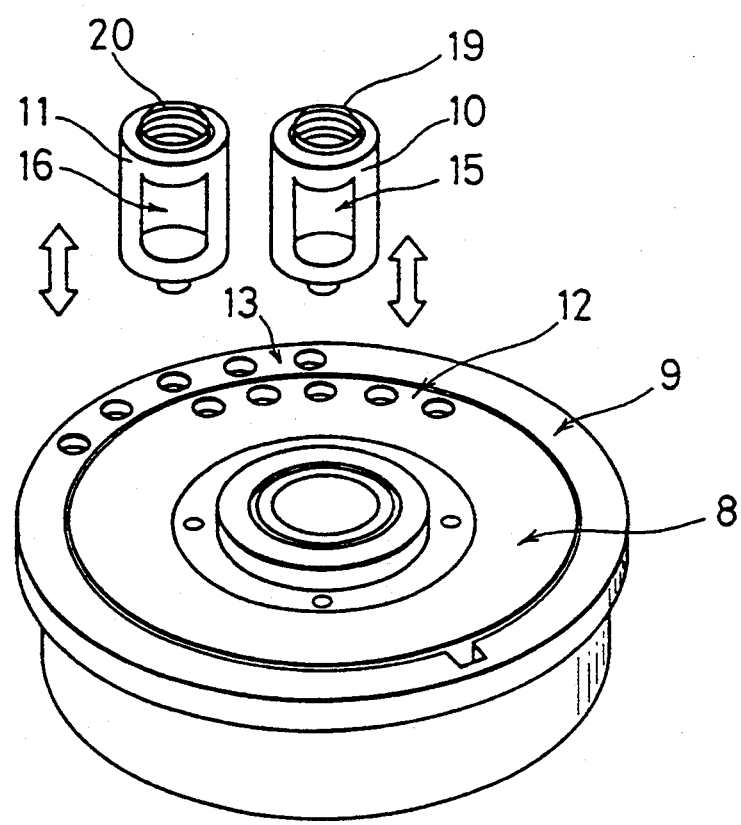
FIG. 2 is a perspective view illustrating an embodiment of a braking unit and a check pin.

In this panning braking device, two braking units (5) and (6) for enacting a braking force against the rotation of the rotating member (3) are concentrically arranged through a fixing member (7). The braking units (5) and (6) are different in the braking force from each other. In this embodiment, the braking force of the braking unit (5) is smaller than that of the braking unit (6). These braking units (5) and (6) may possibly comprise a braking plate, an intermediate member and a viscous fluid, for example, as disclosed in the above-mentioned Japanese Utility Model Provisional Publication No. 2-96,099 and the U.S. Pat. No. 4,959,671. As shown in FIG. 2, two rows of recesses (12) and (13) selectively engaging with one of the check pins (10) and (11) are concentrically arranged on the sides of cases (8) and (9) of the braking units (5) and (6) to permit a free switchover of torque as described later. By inserting or removing the check pins (10) and (11) into or from any of the recesses of the recess rows (12) and (13), torque is switched over to gradually generate and enact a braking force against the panning. Insertion or removal of the check pins (10) and (11) for this torque switchover are carried out through a check pin driving shaft (14) supported by the longitudinal shaft (4) shown in FIG. 1.

Figure 3:
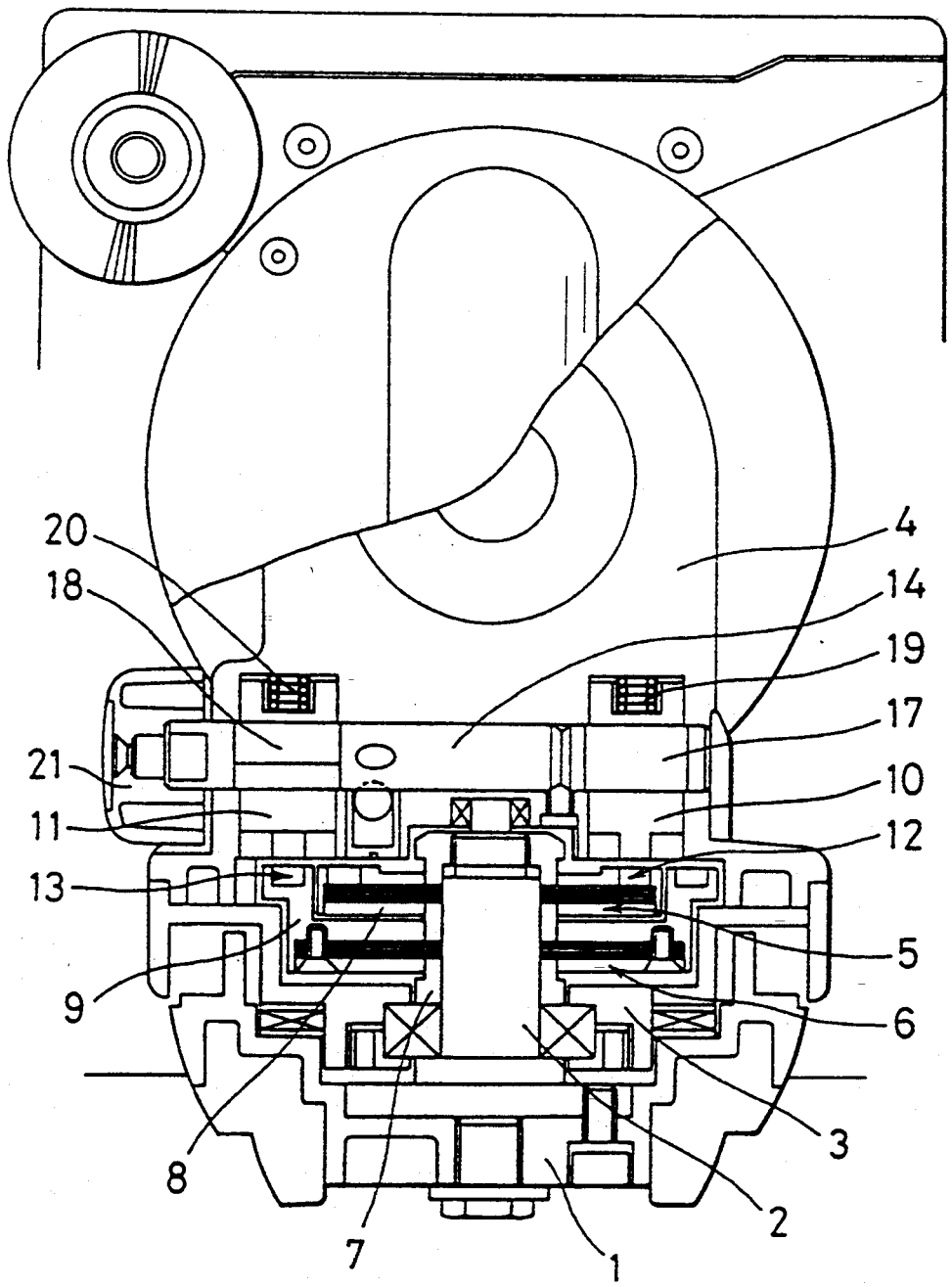
FIG. 3 is a sectional view of FIG. 1 cut along the line X—X.
Figure 4:
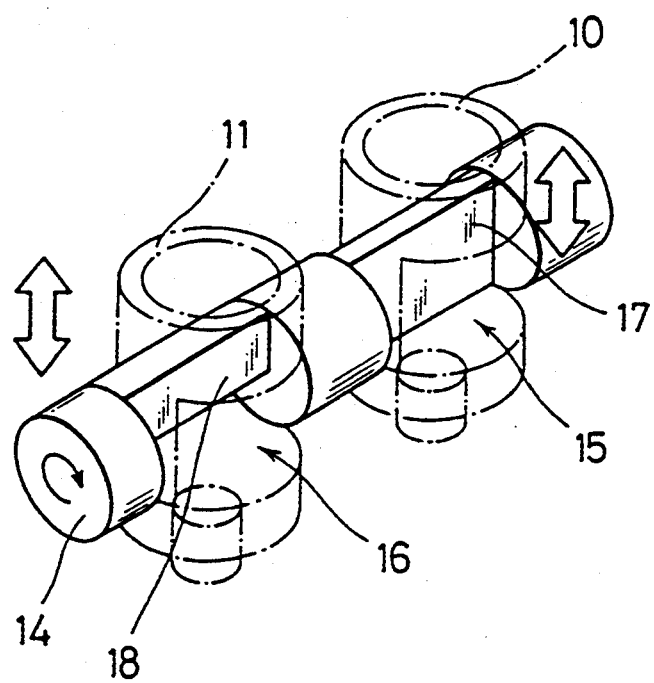
FIG. 4 is a perspective view illustrating an embodiment of a check pin and a check pin driving shaft.

As shown in FIGS. 3 and 4, the check pins (10) and (11) are arranged through the check pin driving shaft (14) above the recess of the recess rows (12) and (13) of the braking units (5) and (6). As shown in FIG. 4, grooves (15) and (16) are respectively provided in The check pins (10) and (11) to movably engage with driving portions (17) and (18) of the check pin driving shaft (14). The driving portions (17) and (18) of the check pin driving shaft (14) are for vertical movements of the check pins (10) and (11), and are different in shape from each other to achieve vertical movements in cycles inherent to The check pins (10) and (11). These vertical movements of the check pins (10) and (11) are available from the rotation of the check pin driving shaft (14). As shown in FIGS. 2 and 3, coil springs (19) and (20) are fitted to the top portions of the check pins (10) and (11) to produce an elastic force between the longitudinal shaft (4) and the check pins (10) and (11), intensify the vertical movements of the check pins (10) and (11), and ensure insertion into or removal from the recess rows (12) and (13) provided on the braking units (5) and (6). An operating knob (21) is also provided at the tip portion of the check pin driving shaft (14). The check pin driving shaft (14) can be rotated by turning the operating knob (21) and vertical movements of the check pins (10) and (11) by the rotation of the check pin driving shaft (14) allow to switch over torque of a desired braking force.

Figure 5A:
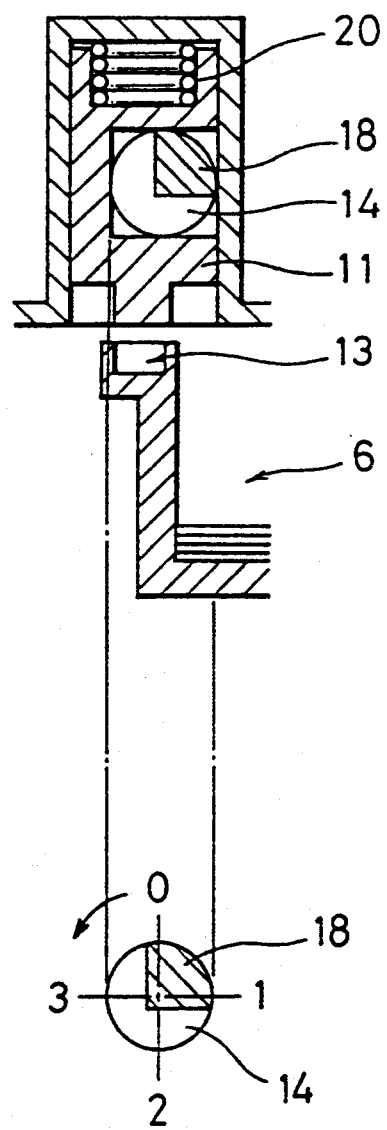
FIGS. 5(a) and 5(b) are partial sectional views illustrating an embodiment of the panning braking device.
Figure 5B:
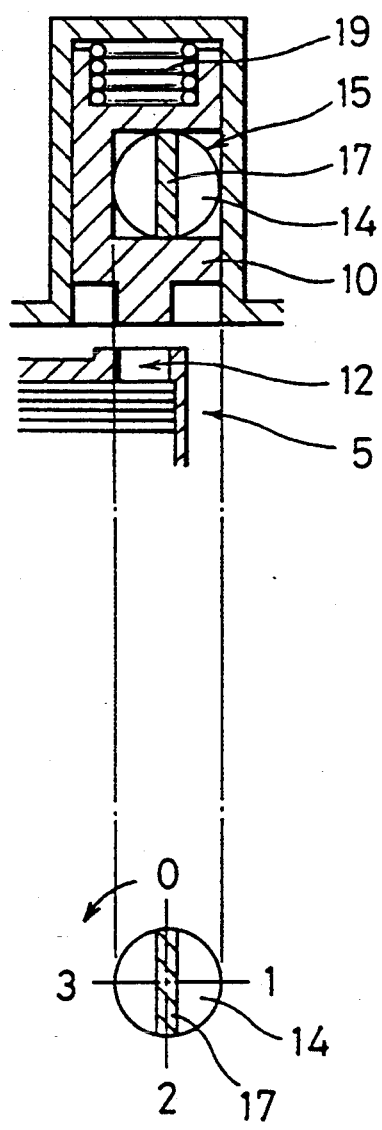

In the embodiment shown in FIG. 5, for example, the driving portion (17) has an approximately rectangular cross-sectional shape so as to permit an alternative switchover between insertion and removal of the check pins (10) into and from the recess of the recess row (12) provided on the braking unit (5). The other driving portion (18) has, on the other hand, an almost ¼ cross-sectional shape so as to permit a continuation of the former state where the check pin driving shaft (11) is not inserted into the recess of the recess row (13) provided on the braking unit (6) and a continuation of the latter state where the check pin (11) is inserted. The continuations of the former and latter states take place in turn.

FIG. 5 depicts the status 0 of the check pin driving shaft (14) in which the check pins (10) and (11) are lifted up by the driving portions (17) and (18) and do not engage with any recess of the recesses rows (12) and (13) of the braking units (5) and (6). In this status 0, no braking force acts upon the panning.

When the check pin driving shaft (14) is turned by 90° in the arrow direction in FIG. 5 to achieve the status 1, the driving portion (17) rotates by 90°, and the check pin (10) goes down under the effect of the elastic force of the coil spring (19) and is inserted into and engaged with one of the recesses of the recess row (12). When the driving portion (18) is rotated by 90°, on the other hand, the check pin (11) maintains the lifted state because of the special shape of the driving portion (18), so that the check pin (11) is not inserted into a recess of the recess row (13). In other words, in the status 1, only the braking force of the braking unit (5) acts during the panning.

When panned, the longitudinal shaft (4) rotates together with the rotating member (3) shown in FIG. 1. Since the check pin (10) is engaged with a recess of the braking unit (5) by the check pin driving shaft (14)

supported by the longitudinal shaft (4), the case (8) of the braking unit (5) rotates corresponding to the panning of the longitudinal shaft (4). The braking plate and other components incorporated in the braking unit (5) are, on the other hand, fixed through the fixing member (7) to the panning shaft (2). A resistance is therefore generated by the viscous fluid in the braking unit (5). This resistance serves as a braking force and acts against the panning.

Turning the check pin driving shaft (14) by further 90° into the status 2 renders the driving portion (17) in the same status as the status 0, thus lifting up the check pin (10) and removing it from the recess. The check pin (11) goes down under the effect of the elastic force of the coil spring (20) by the rotation of the driving portion (18) and is inserted into and engaged with a recess of the recesses row (13). In the status 2, only the braking force of the braking unit (6) acts against the panning. Because the braking force of the braking unit (6) is larger than that of the braking unit (5), a larger braking force acts in the status 2 than in the status 1.

Turning the check pin driving shaft (14) by a further 90° into the status 3 causes both the check pins (10) and (11) to be inserted into and engaged with recess of the recess rows (12) and (13) of the braking units (5) and (6). The braking force is summed up those of the braking units (5) and (6).

In the present invention, four degrees of the braking force as mentioned above may be available, and it is possible to gradually switch over between these degrees of the braking force. Panning in response to the weight of the device such as a camera is thus achieved, and a smooth panning is also available. By appropriately adjusting the number of the braking units and the shape of the driving portion of the check pin driving shaft, it is possible to act a braking force against the panning which has any magnitude and can be switched over at any of degrees. The display of the degree of the braking force such as 0 to 3 may be provided at a convenient place such as at the operating button (21) shown in FIG. 3, and a user can switch over at torque of the desired braking force simply and easily while confirming the display.

In the tilting section (B) of the tripod head shown in FIG. 1, a tilting strut (23) is rotatably supported by a bearing, etc. to an unrotatable tilting shaft (22) which is fixed to the longitudinal shaft (4). In this embodiment, a weight balancer for ensuring a smooth tilting is provided at the right of the tilting shaft (22).

In this weight balancer, two spring units (26) and (27) having spiral springs (24) and (25) therein are concentrically fitted through a fixing member (28) on the tilting shaft (22). These spring units (26) and (27) generate righting moments to act against the tilting of the tilting strut (23). The righting moments of the spring units (26) and (27), i.e., the elastic forces of the spiral springs (24) and (25) are different from each other. In this embodiment, the righting moment of the spring unit (26) is smaller than that of the spring unit (27).

Figure 6:
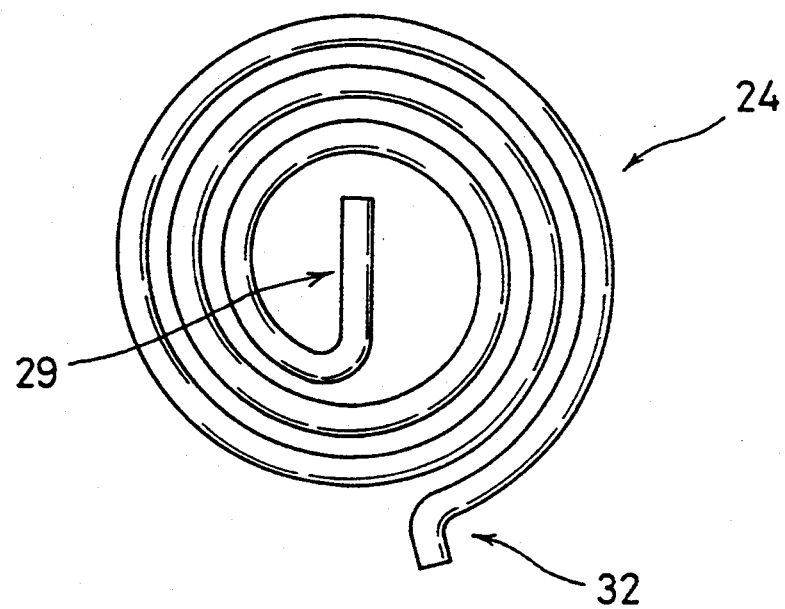
FIG. 6 is a plan view illustrating an embodiment of a spiral spring incorporated in the spring unit.
Figure 7:
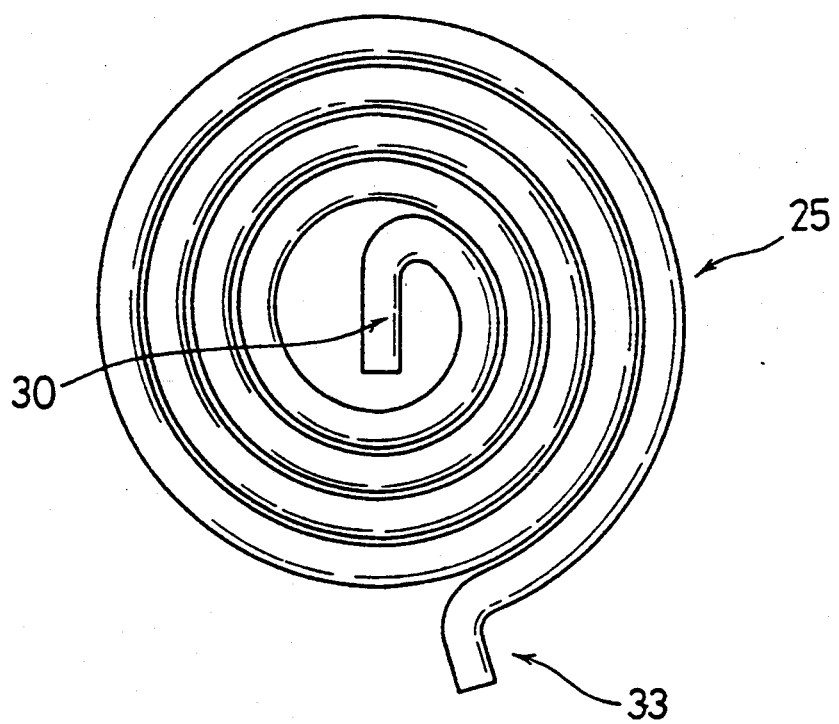
FIG. 7 is a plan view illustrating another spiral spring.

FIGS. 6 and 7 illustrate the spiral springs (24) and (25) in the spring units (26) and (27), respectively.

It is possible to impart different elastic forces to the springs incorporated in the spring units by selecting an appropriate thickness, material, diameter or other parameters. For each of these spiral springs (24) and (25), one ends (29) and (30) are fixed in a groove (31) of the tilting shaft (22) shown in FIG. 1, and the other ends (32) and (33) are fixed to the fixing portions (36) and (37) of the cases (34) and (35) of the spring units (26) and (27) as shown in FIGS. 8 and 9, respectively. Elastic forces are produced between the tilting shaft (22) and the cases (34) and (35) and righting moments act to restore to the original state of the tilting strut (23) while tilting. In FIG. 1, two spiral springs (24) and (25) are incorporated in the spring units (26) and (27), respectively, but there is no limitation in the number of the spiral spring. An appropriate number may be selected in response to the weight of the device such as a camera. As shown in FIGS. 6 and 7, the spiral direction of the spiral springs (24) and (25) in the spring units (26) and (27) may be, for example, reversed between the two.

As shown in FIGS. 8 and 9, each recess (38) and (39) is provided on the side of each case (34) and (35) of the spring units (26) and (27). When the spring units (26) and (27) are assembled, those recesses (38) and (39) become in parallel with each other.

Figure 10A:
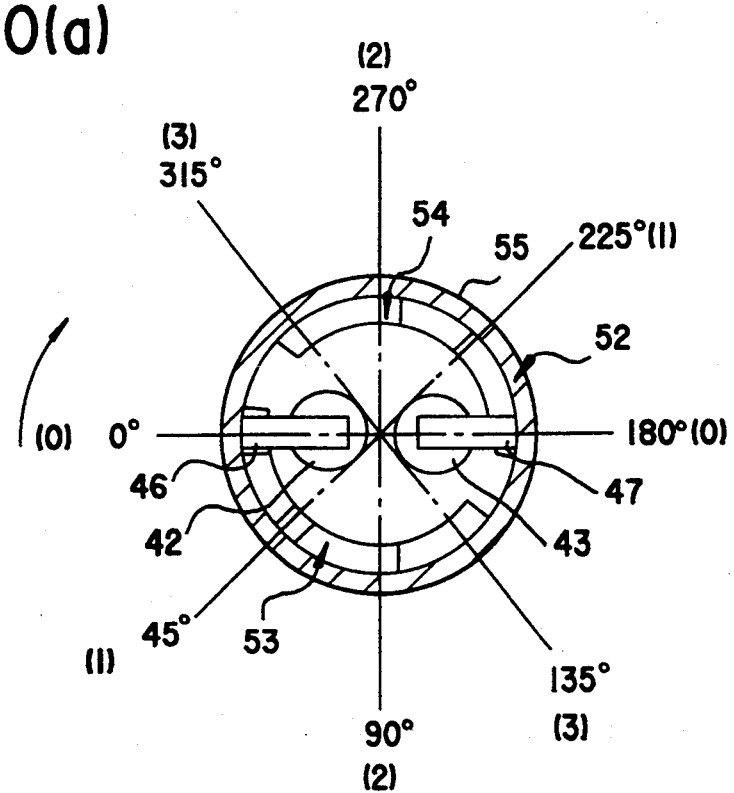
FIGS. 10(a) and 10(b) are a plan view and a sectional view illustrating an embodiment of the righting moment switching mechanism of the weight balancer, respectively.
Figure 10B:
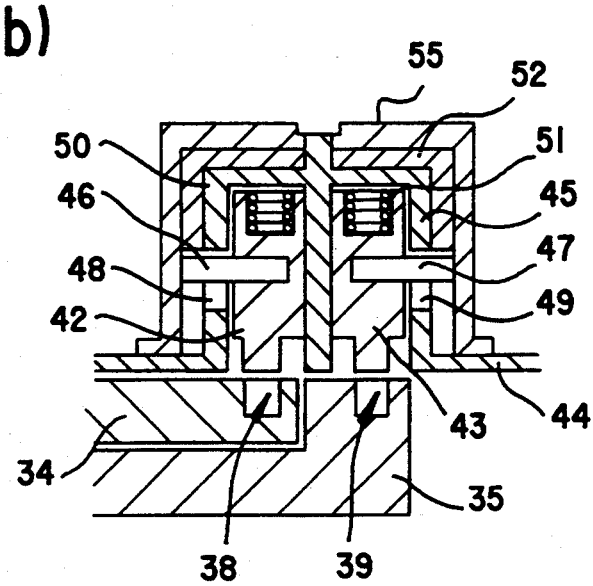
Figure 11:
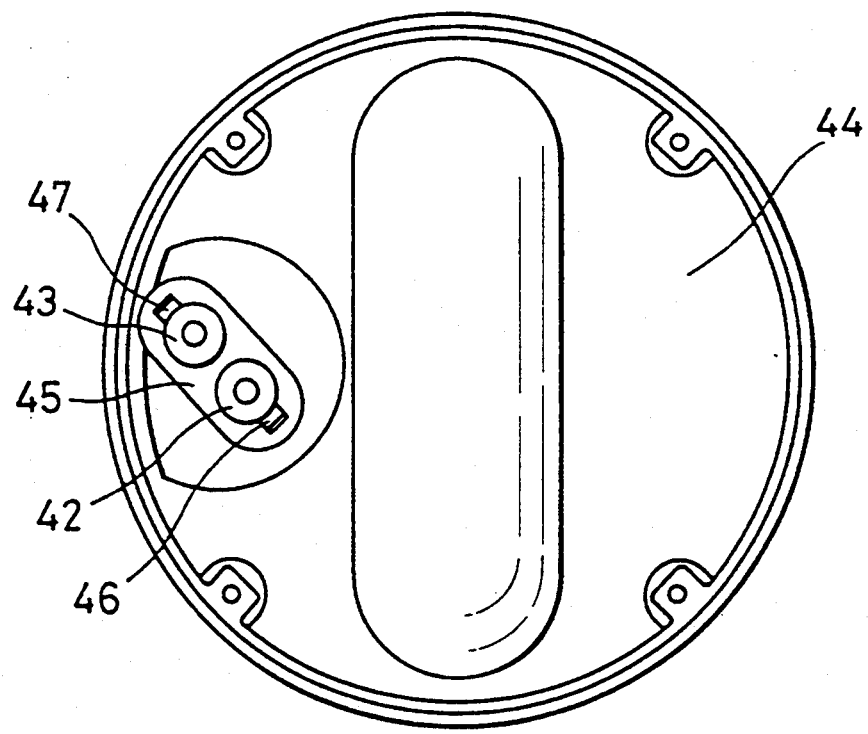
FIG. 11 is a plan view illustrating an embodiment of a cover and a check pin.

As shown in FIGS. 10(a) and 10(b), check pins (42) and (43) are located at the positions corresponding to the recesses (38) and (39) of the cases (34) and (35). These check pins (42) and (43) are inserted into a casing (45) provided on the side of a covet (44) of the tilting portion (B) shown in FIGS. 1 and 11. As shown in FIG. 10, the check pins (42) and (43) possess auxiliary pins (46) and (47). These auxiliary pins (46) and (47) run through long holes (48) and (49) of the casing (45) and project outward from the casing (45). It is therefore possible to cause the check pins (42) and (43) to slide within the range of the length of the long holes (48) and (49) of the casing (45). Coil springs (50) and (51) ate fitted at the upper portions of the check pins (42) and (43), and ensuring insertion into and removal from the recesses (38) and (39) provided on the cases (34) and (35). A check pin driving cap (52) for sliding the auxiliary pins (46) and (47) is rotatably provided on the casing (45) with the side end surface thereof in contact with the auxiliary pins (46) and (47).

Driving portions (53) and (54) for sliding the check pins (42) and (43) are provided on the side end surface of the check pin driving cap (52), and are different in shape from each other so as to achieve slide in cycle inherent to the individual check pins (42) and (43).

Figure 12:
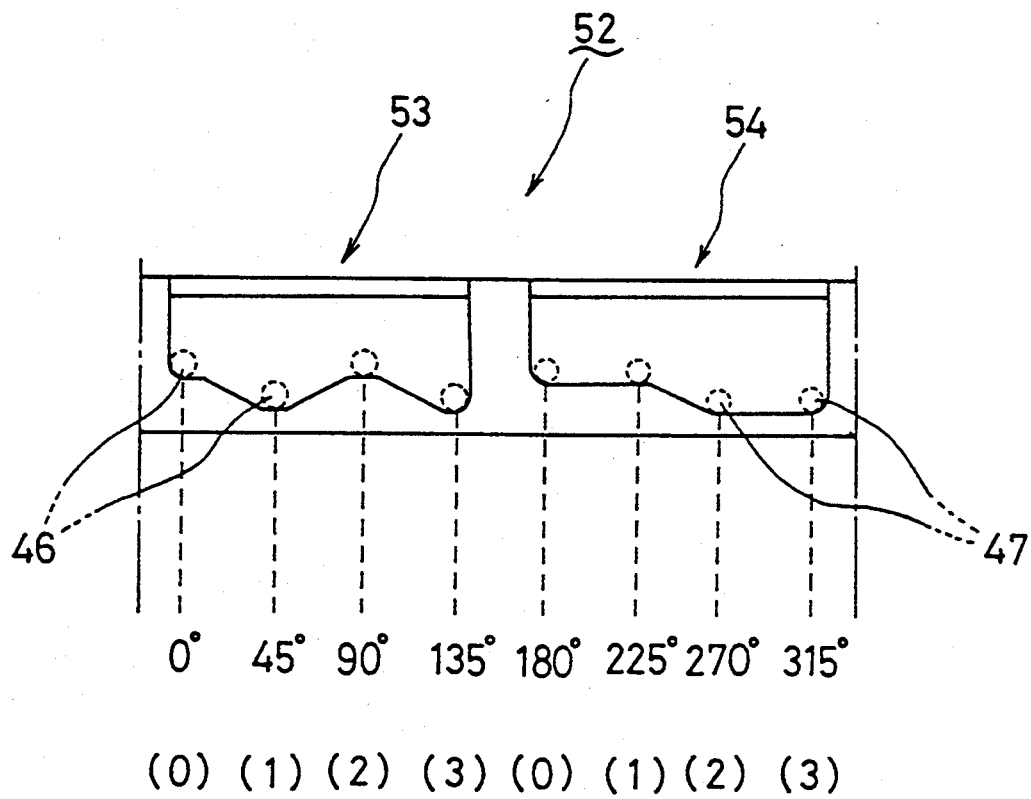
FIG. 12 is a development of the check pin driving cap shown in FIG.

As shown in FIG. 12, check pin driving portions (53) (54) are provided on the side end surface of the check pin driving cap (52). The check pin driving portion (53) causes the check pin (42) shown in FIG. 10 to be, in turn, inserted into or removed from the recess (38) on the side surface of the case (34) of the spring unit (26). On the other hand, the check pin driving portion (54) makes one state continue twice and change into the other state after the continuation of that state by changing insertion and removal of the check pin (43) into and from the recess (39) of the case (35) of the spring unit (27). In this embodiment, the driving portions (53) and (54) have a phase of 180° since the two check pins (42) and (43) are in parallel with each other.

In the status 0, the auxiliary pins (46) and (47) do not slide, and hence the check pins (42) and (43) are not inserted into the recesses (38) and (39) provided on the cases (34) and (35) of the spring units (26) and (27). In other words, righting moments do not act against the tilting in the status 0.

When the status 1 is achieved by turning the check pin driving cap (52) in the arrow direction in FIG. 10(a) by 45°, the auxiliary pin (46) is pushed by the driving portion (53) and slides. As a result, the check pin (42) slides and is inserted into and engaged with the recess (38). On the other hand, the auxiliary pin (47) maintains the same status as the status 0 because of the shape of the driving section (54). The check pin (43) does not therefore engage with the recess (39). In other words, only the spring unit (26) actuates and a righting moment thereof acts against the tilting.

When tilting, the cover (44) connected to the tilting strut (23) shown in FIG. 1 tilts together with the tilting strut (23). Since the check pin (42) is incorporated in the casing (45) of the cover (44) and engages with the recess (38) of the case (34), the case (34) of the spring unit (26) therefore rotates around the tilting shaft (22). Corresponding to this tilting of the case (34), an elastic force is produced in the spiral spring (24) incorporated in the spring unit (26), thus producing a righting moment.

When turning the check pin driving cap (52) by further 45° from the status 1 to the status 2, the driving portion (53) brings the auxiliary pin (46) back to the position corresponding to the status 0. The check pin (42) is removed from the recess (38). The auxiliary pin (47) is, on the other hand, pushed by the driving portion (54) and slides, this causing the check pin (43) to slide and be inserted into and engaged with the recess (39) provided on the case (35). In the status 2, only the spring unit (27) actuates. Because the righting moment of the spring unit (27) is larger than that of the spring unit (26), the righting moment in the status 2 is larger than that in the status 1.

When turning the check pin driving cap (52) by further 45° from the status 2 to the status 3, both the check pins (42) and (43) engage with the recesses (38) and (39), so that the sum of the righting moments of the spring units (26) and (27) acts against the tilting.

In the present invention, as described above, it is possible to simply and easily switch over the righting moment of the weight balancer, and this switchover is achieved by means of simple structure and configuration. The operability upon tilting of the tripod head is also improved.

The check pin driving cap (52) may be rotated through the operating knob, button, (55) connected to the check pin driving cap (52) as shown in FIG. 10. The display of the above-mentioned status 0 to 3 may be provided on this operating button (55), and hence a user can simply and easily confirm the magnitude of the righting moment. It is needless to mention that the shape of the side end surface of the check pin driving cap (52) is not restrictive in the embodiment mentioned above, but any appropriate one may be selected in response to the number of the spring unit, switchover stage of the righting moment or other parameters.

A tilting braking device for generating a braking force to act against the tilting of the tilting strut (23) is provided at the left of the tilting shaft (22) in the tilting portion (B) of the tripod head shown in FIG. 1.

This tilting braking device uses the braking units of the same configuration and structure as of the panning braking device provided in the panning portion (A) as described above.

More specifically, braking units (60) and (61) having circular rows of recesses (58) and (59) on the sides of the cases (56) and (57) are concentrically supported through a fixed member (62) on the tilting shaft (22). A torque switchover mechanism (not shown) is applied to for the braking units (60) and (61), which has the same configuration and structure as of the above-mentioned righting moment switchover mechanism for the weight balancer. This torque switchover mechanism makes it possible to switch over the braking force against the tilting on the side of the cover (63). This tilting braking device makes it available a smooth tilting with an improved operability.

Figure 13:
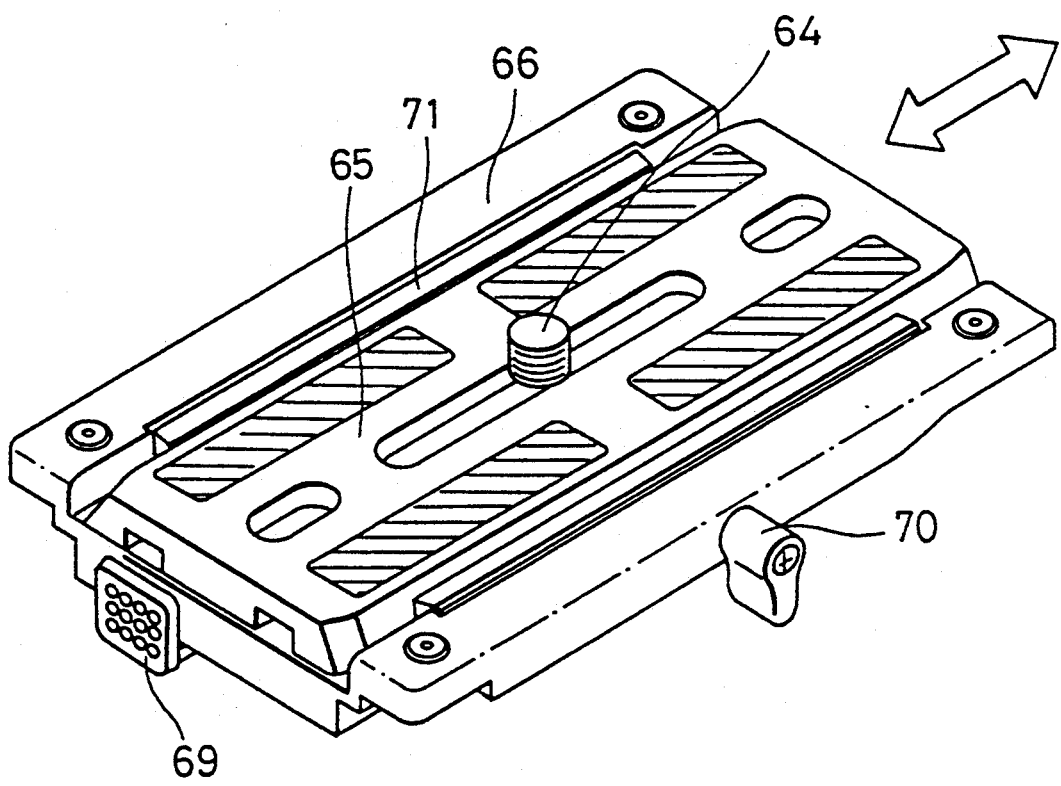
FIG. 13 is a perspective view illustrating an embodiment of the sliding plate device.

Further, a sliding plate device, for example, as shown in FIG. 13 is connected to the upper portion of the tilting strut (23) in the sliding portion (C) of the tripod head shown in FIG. 1.

Figure 14:
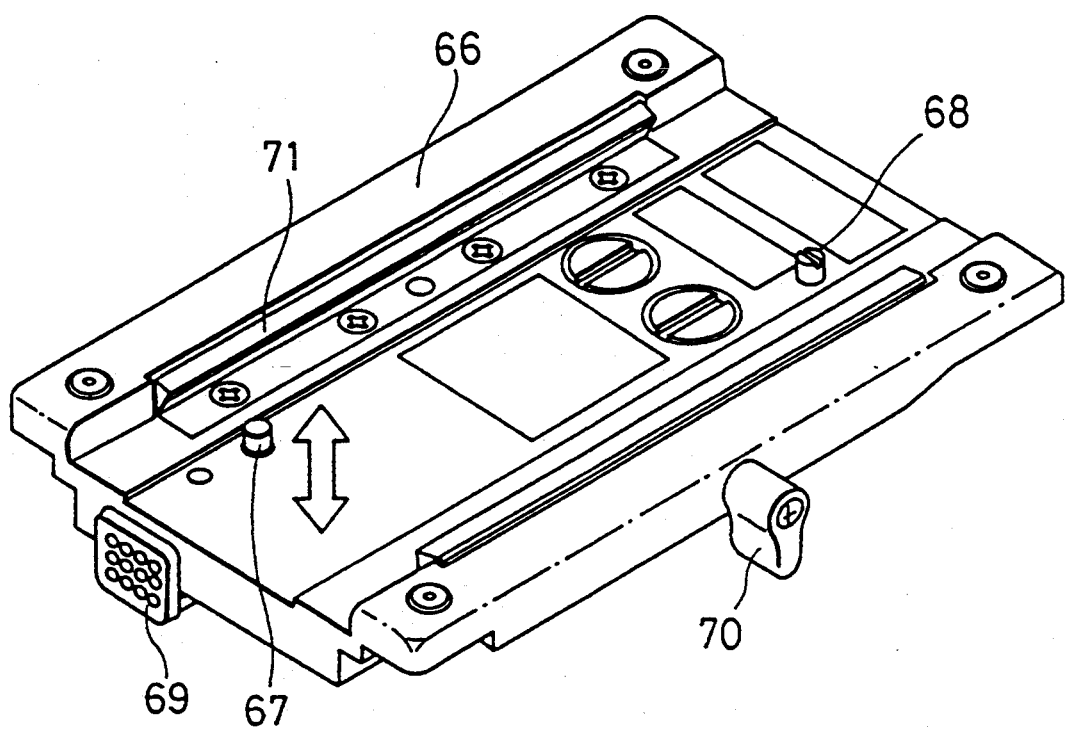
FIG. 14 is a perspective view illustrating an embodiment of the camera stand shown in FIG. 13.

The sliding plate device disclosed in Japanese Utility Model Provisional Publication No. 2-114,297 and the U.S. Pat. No. 4,979,709 is preferably prerequisite to the present invention. More particularly, as shown in FIG. 13, a sliding plate (65) having a camera fitting screw (64) for securing a device such as a camera is provided slidably in the arrow direction in FIG. 13 and releasably on the camera stand (66). As shown in FIG. 14, a vertically movable stop pin (67) and a stopper (68) are provided on the upper surface of the camera stand (66). These stop pin (67) and stopper (68) movably engage with grooves provided on the back surface of the sliding plate (65) shown in FIG. 13. The vertical movement of the stop pin (67) is accomplished by the push-button (69) on the end edge of the camera stand (66). A locking lever (70) for fixing the sliding plate (65) at any position is provided on the side end portion of the camera stand (66). In the present invention, a set spring (71) capable of floating and sinking along the inner side surface of the camera stand (66) is provided for not only fitting of the sliding plate (65) in the sliding direction, but also fitting from above the camera stand (66).

Figure 15:
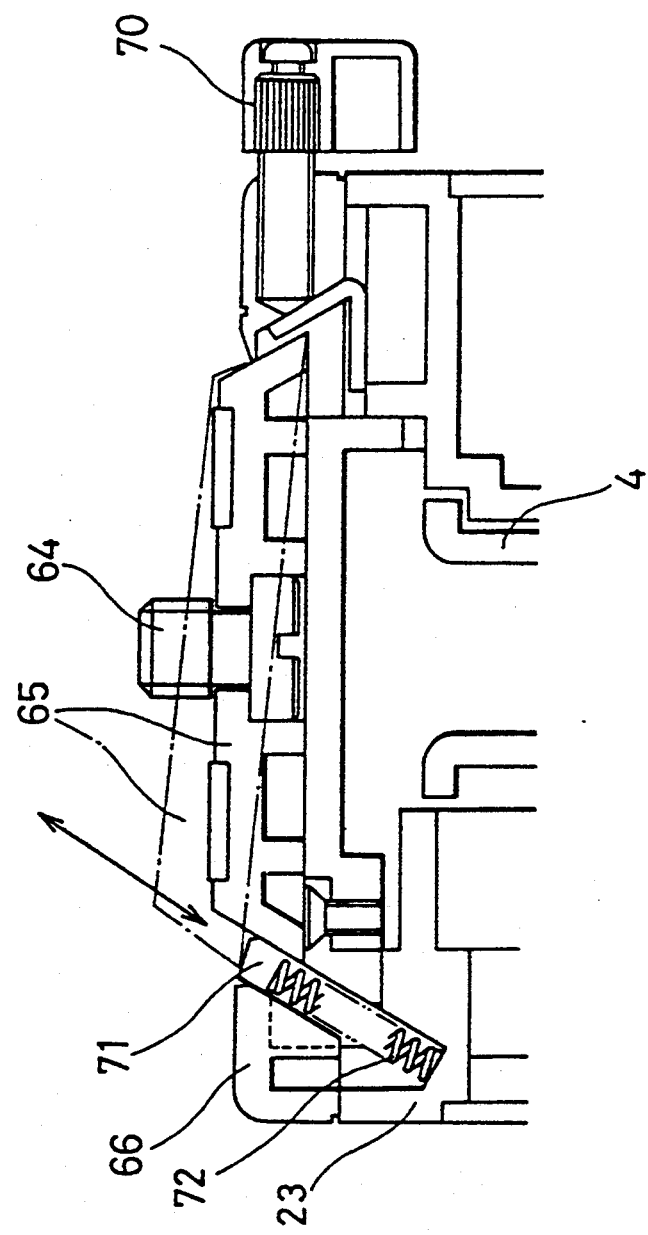
FIG. 15 is a partial sectional view illustrating an embodiment of a structure of the set spring shown in FIG. 13 and the stare When the sliding plate is attached.
Figure 16:
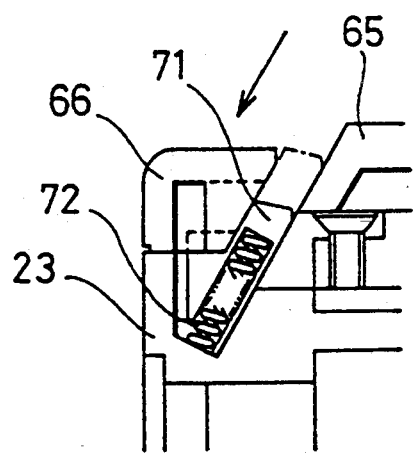
FIGS. 16 (a) and 16 (b) are partial sectional views illustrating other states of the sliding plate.
Figure 16:
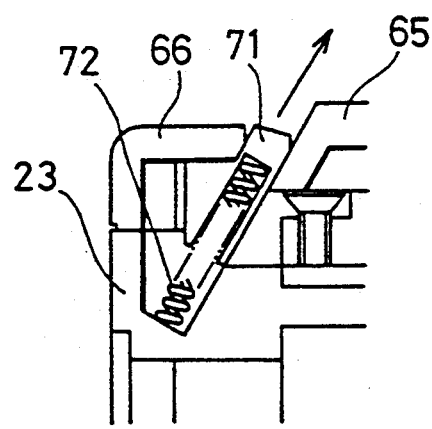

As shown in FIGS. 15 and 16, the side surface of the set spring (71) is, for example, slant so as to meet the inner side surface of the camera stand (66) and the side surface of the sliding plate (65). A spring (72) is incorporated in the set spring (71). An end of this spring (72) is fixed on the tilting-strut (23). The elastic force of the spring (72) permits floating and sinking of the set spring (71) in the arrow direction in FIGS. 15 and 16.

When fitting the sliding plate (65) onto the camera stand (66) as shown in FIG. 15, one of the side ends of the sliding plate (65) opposite to the set spring (71) is brought into contact with the inner side surface of the camera stand (66) and then the set spring (71) is pressed by the rear of the sliding plate (65) and is sunk down along the inner side surface of the camera stand (66).

As shown in FIG. 16(a), when the set spring (71) is completely sunk down, the set spring (71) comes off the lower surface of the sliding plate (65), so that the sliding plate (65) is positioned at a prescribed position on the camera stand (66).

Then, as shown in FIG. 16(b), the elastic force of the built-in spring (72) causes the set spring (71) to restore the original state, press and support the other side end of the sliding plate (65) than that mentioned above.

As shown in FIG. 17, it is possible to provide each set spring (71a)(71b) at each inner side portion of the camera stand (66) in the present invention. There is no particular limitation in the installation of the set spring to the inner side portion of the camera stand.

The present invention thereby enables one to simply and easily fit the sliding plate (65) mounting a device such as a camera, a video camera, a movie camera or the like from a side direction of the camera stand (66) independent of the size of that device and to improve operability.

It is needless to mention that the present invention is not limited to the embodiments described above, but many variations are possible in details.

I claim:

1. A panning braking device for a tripod head, comprising:

a plurality of braking units, with different braking forces, having circular rows of recesses on sides of cases of the braking units, said braking units being supported concentrically on a panning shaft; each of said braking units including a braking plate, an intermediate member, and a viscous braking fluid; a plurality of check pins which are each releasably and selectively engaged with a recess of an individual one of said circular rows of recesses of said braking units; and a torque switchover mechanism allowing to freely switch over torque by a check pin driving shaft for causing each of said check pins to stepwise insert into and remove from the respective said recess so as to create degrees of braking force resulting from combinations of said braking units being activated.

2. A panning torque switchover mechanism as claimed in claim 1, wherein said torque switchover mechanism includes: said check pins being a first check pin and a second check pin; said check pin driving shaft having a first check pin driving portion which, in turn, switches over insertion and removal of said first check pin into and from a recess and a second check pin driving portion which makes one state of insertion or removal of said second check pin into or from a recess continue and changes said state into the other state; and first and second grooves provided in said first and second check pins movably engaging with said first and second check pin driving portions, respectively.

3. A panning torque switchover mechanism as claimed in claim 1, wherein said torque switchover mechanism in a first state activates a first of said braking units without activating a second of said braking units, in a second state activates said second of said braking units without activating said first of said braking units, in a third state does not activate either of said first and second braking units, and in a fourth state activates both said first and second braking units, so as to create four degrees of braking force resulting from each of said four states.

4. A tilting braking device for a tripod head, comprising a plurality of braking units, with different braking forces, having circular rows of recesses on sides of cases of the braking units, said braking units being concentrically supported on a tilting shaft; each of said braking units including a braking plate, an intermediate member, and a viscous braking fluid; a plurality of check pins which are each releasably and selectively engaged with a recess of an individual one of said circular rows of recesses of said braking units; and a torque switchover mechanism allowing to freely switch over torque by a check pin driving cap for causing each of said check pins to stepwise insert into and remove from the respective recess so as to create degrees of braking force resulting from combinations of said braking units being activated.

5. A tilting torque switchover mechanism as claimed in claim 4, wherein said torque switchover mechanism in a first state activates a first of said braking units without activating a second of said braking units, in a second state activates said second of said braking units without activating said first of said braking units, in a third state does not activate either of said first and second braking units, and in a fourth state activates both said first and second braking units, so as to create four degrees of braking force resulting from each of said four states.

6. A tilting braking device for a tripod head, comprising a plurality of braking units, with different braking forces, having circular rows of recesses on sides of cases of the braking units, said braking units being concentrically supported on a tilting shaft; a plurality of check pins which are each releasably and selectively engaged with a recess of an individual one of said circular rows of recesses of said braking units; and a torque switchover mechanism allowing to freely switch over torque by a check pin driving cap for causing each of said check pins to stepwise insert into and remove from the respective recess so as to create degrees of braking force resulting from combinations of said braking units being activated;

wherein said tilting torque switchover mechanism includes: said check pins including a first check pin and a second check pin; said check pin driving cap having a side end surface, a first check pin driving portion on said end surface which, in turn, switches over insertion and removal of said first check pin into and from a recess and a second check pin driving portion on said side end surface which makes one state of insertion or removal of said second check pin into or from a recess continue and changes said state into the other state; and a first auxiliary pin and a second auxiliary pin being in contact with said check pin driving portions of said check pin driving cap and fixed to said first check pin and said second check pin, respectively.

* * * * *

UNITED STATES PATENT AND TRADEMARK OFFICE
CERTIFICATE OF CORRECTION

PATENT NO.  : 5,415,254
DATED       : May 16, 1995
INVENTOR(S) : Masao ISHIKAWA

It is certified that error appears in the above-identified patent and that said Letters Patent is hereby corrected as shown below:

On the cover page, Item [73], "Heiwa Seiki Kagya Co., Ltd." should be --Heiwa Seiki Kogyo Co., Ltd.--.

On the cover page, after Item [62], please add Item --
[30]    Foreign Application Priority Data
    Aug. 9, 1991 [JP] Japan ............200940/1991--.

Signed and Sealed this

Fourteenth Day of November, 1995

Attest:

BRUCE LEHMAN

Attesting Officer

Commissioner of Patents and Trademarks